United States Patent
Struble

(10) Patent No.: US 7,912,753 B2
(45) Date of Patent: Mar. 22, 2011

(54) SYSTEM AND METHOD FOR CONTROLLING THE PRESENTATION OF ADVERTISEMENTS

(75) Inventor: Christian L. Struble, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2414 days.

(21) Appl. No.: 09/894,213

(22) Filed: Jun. 27, 2001

(65) Prior Publication Data
US 2003/0004796 A1    Jan. 2, 2003

(51) Int. Cl.
*G06Q 30/00* (2006.01)

(52) U.S. Cl. .......... 705/14.5; 705/14.4; 705/10; 725/35; 455/414.3; 379/88.17

(58) Field of Classification Search .................... 705/10, 705/14, 14.5, 14.4; 725/32, 35; 455/414.3; 379/88.17
See application file for complete search history.

(56) References Cited

U.S. PATENT DOCUMENTS

| | | | | |
|---|---|---|---|---|
| 5,565,909 A | * | 10/1996 | Thibadeau et al. | ............. 725/35 |
| 6,636,733 B1 | * | 10/2003 | Helferich | ................... 455/412.2 |

* cited by examiner

*Primary Examiner* — Raquel Alvarez

(57) ABSTRACT

The present disclosure relates to a system and method for controlling the presentation of advertisements. In one arrangement, the system and method are adapted to collect weather condition information, determine which advertisements are appropriate for presentation based upon the weather condition information, and facilitate presentation of appropriate advertisements.

18 Claims, 6 Drawing Sheets

| HEAT | HUMIDITY | COLD | HIGH WINDS | BRIGHT SUN | RAIN | SNOW |
|---|---|---|---|---|---|---|
| AD 01 | AD 03 | AD 05 | AD 07 | AD 09 | AD 11 | AD 13 |
| AD 02 | AD 04 | AD 06 | AD 08 | AD 10 | AD 12 | AD 14 |
| ⋮ | ⋮ | ⋮ | ⋮ | ⋮ | ⋮ | ⋮ |

| HEAT | HUMIDITY | COLD | HIGH WINDS | BRIGHT SUN | RAIN | SNOW |
|---|---|---|---|---|---|---|
| AD 01 | AD 03 | AD 05 | AD 07 | AD 09 | AD 11 | AD 13 |
| AD 02 | AD 04 | AD 06 | AD 08 | AD 10 | AD 12 | AD 14 |
| ...→ | ...→ | ...→ | ...→ | ...→ | ...→ | ...→ |

FIG. 6

SYSTEM AND METHOD FOR CONTROLLING THE PRESENTATION OF ADVERTISEMENTS

FIELD OF THE INVENTION

The present disclosure relates to a system and method for controlling the presentation of advertisements. More particularly, the disclosure relates to a system and method that controls the display of advertisements in relation to time and weather information.

BACKGROUND OF THE INVENTION

Programmable displays are often used by fuel stations to advertise goods and services that the stations offer. For example, such displays are commonly provided on gasoline pumps at which the user (i.e., customer) pumps gas. In addition, large roadside displays are frequently used along side highways or often attached to buildings in urban areas to advertise goods and services to potential customers. Normally, the displays are programmed to present certain featured advertisements until reprogrammed to display other advertisements.

In that such displays run the same advertisements until reprogrammed to do otherwise, inappropriate advertisements can be presented to the user. For instance, where the display is not reprogrammed by the fuel station or other administrator for several months, it is possible to present an advertisement intended for hot weather conditions during cold winter months. Such disregard can therefore result in advertisements for "ice cream" or "cold drinks" being presented to customers when the temperature is below freezing. Clearly, the presentation of such advertising is a waste of the display and may result in lost sales where the customer would have been interested in purchasing something that is more appropriate to current weather conditions (e.g., hot chocolate). Similarly, advertisements may be inappropriate in view of the time of day which they are run. For instance, it would probably not be desirable for a fuel station to advertise steak dinners "now available" during the early morning hours.

Although the running of inappropriate advertisements can be avoided with diligent reprogramming of the displays as conditions change, the presentation of inappropriate advertisements is bound to occur from time to time due to human neglect. Therefore, it can be appreciated that it would be desirable to have a system and method for automatically controlling the presentation of advertisements that are configured to only present advertisements for goods and services that are appropriate relative to current and/or expected conditions.

SUMMARY OF THE INVENTION

The present disclosure relates to a system and method for controlling the presentation of advertisements. In one arrangement, the method comprises the steps of collecting weather condition information, determining which advertisements are appropriate for presentation based upon the weather condition information, and facilitating presentation of appropriate advertisements.

The present invention further provides a system for controlling the presentation of advertisements. Broadly described, the system comprises means for collecting weather condition information, means for determining which advertisements are appropriate for presentation based upon the weather condition information, and means for facilitating presentation of appropriate advertisements.

The present disclosure further provides advertisement presentation control software stored on a computer readable medium. In one arrangement, the software comprises logic configured to collect weather condition information, logic configured to determine which advertisements are appropriate for presentation based upon the weather condition information, and logic configured to facilitate presentation of appropriate advertisements.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the invention.

FIG. 6 is a schematic representation of a correlation chart that can be consulted by the advertising control module shown in FIG. 3.

DETAILED DESCRIPTION

As noted above, current advertisement presentation control systems and methods present several drawbacks. Accordingly, it would be desirable to have advertisement presentation control systems and methods that can be used to avoid the display of advertisements that are inappropriate in relation to current and/or upcoming weather conditions or the current time of day. An example system for practicing the methods will first be discussed followed by examples as to how the system operates to control the presentation of advertisements.

Figure 1:
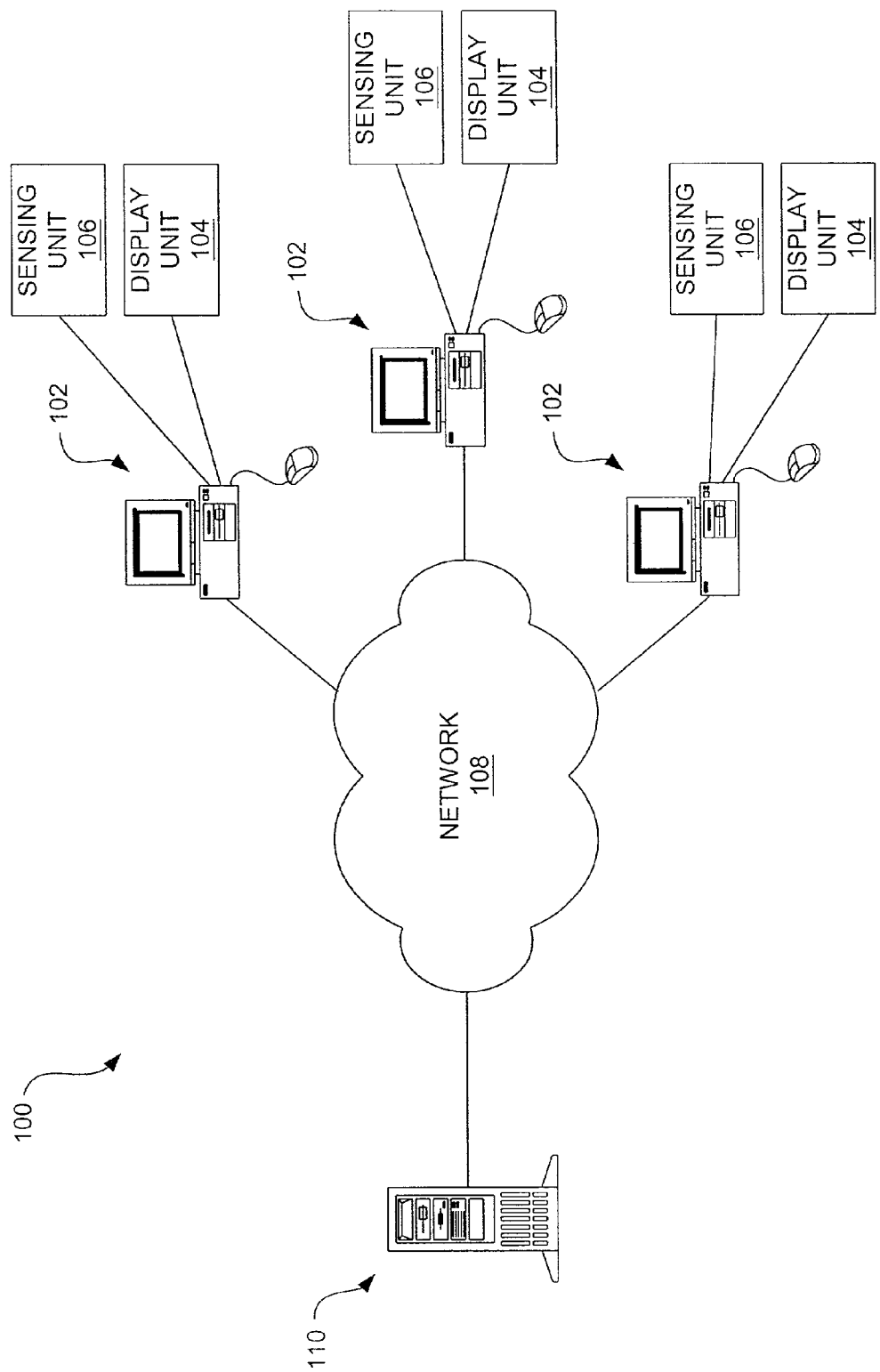
FIG. 1 is a schematic view of a system for controlling the presentation of advertisements.
Figure 2:
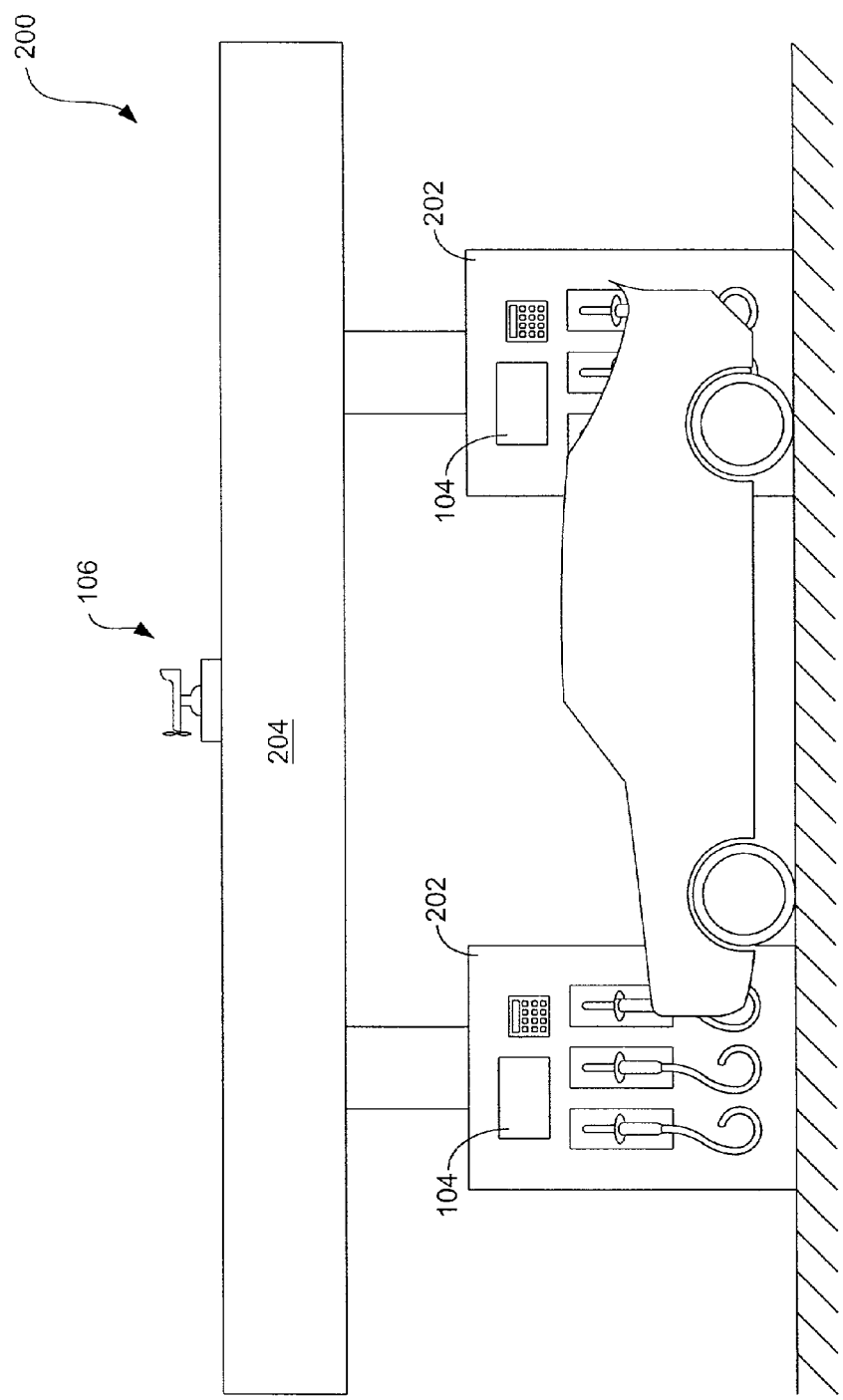
FIG. 2 is a schematic view of an example environment for the system shown in FIG.

Referring now to the drawings, in which like numerals indicate corresponding parts throughout the several views, FIG. 1 illustrates a system 100 for controlling the presentation of advertisements. As indicated in this figure, the system 100 can comprise one or more local computing devices 102 that can be used to control the operation of one or more display units 104 that are communicatively coupled to the computing devices. By way of example, the local computing devices 102 can comprise personal computers (PCs) that are operated within fuel stations (typically one at each station) and the display units 104 can comprise liquid crystal displays (LCDs) or light emitting diode (LED) displays provided on fuel pumps at which users (i.e., customers) can pump fuel into their vehicles. Such an environment is schematically illustrated in FIG. 2, which illustrates a fuel pumping island 200 and two such fuel pumps 202. Although the local computing devices 102 have been described as being operated within fuel stations, it will be appreciated that one or more components of the computing devices 102 can exist in other locations, for instance, housed within the fuel pumps 202 themselves.

With reference back to FIG. 1, the system 100 further includes sensing units 106 that are adapted to detect various current weather conditions. As indicated in FIG. 2, the sensing units 106 can be mounted in a location at which tampering is unlikely and at which current weather conditions can be accurately sensed. By way of example, the sensing units 106 can be mounted on the roof of an overhang 204 of the fuel pumping island 200. The sensing units 106 can comprise one or more individual sensors that are adapted to detect various conditions weather such as ambient temperature, barometric pressure, precipitation, sunlight (i.e., brightness), humidity, wind force, etc. Although particular weather conditions have been identified, it is to be understood that the sensing units 106 can be adapted to detect substantially any weather condition which may be relevant to the selection of advertisements that will be presented to the customer with the display unit(s) 104. As indicated in the schematic illustration of FIG. 2, one sensing unit 106 may be provided at each fuel station.

As is further indicated in FIG. 1, each of the local computing devices 102 can, optionally, be connected to a network 108 and, therefore, to a remote computing device 110 that is also connected to the network. The network 108 can comprise one or more subnetworks that are communicatively coupled to each other. By way of example, these networks can include one or more local area networks (LANs) and/or wide area networks (WANs). Typically, however, the network 108 comprises a set of networks that forms part of the Internet. As indicated in FIG. 1, the remote computing device 110 can comprise a network server. Although a network server is described and shown, it is to be appreciated that a server is used as an example only and is not intended to limit the scope of the present disclosure.

Figure 3:
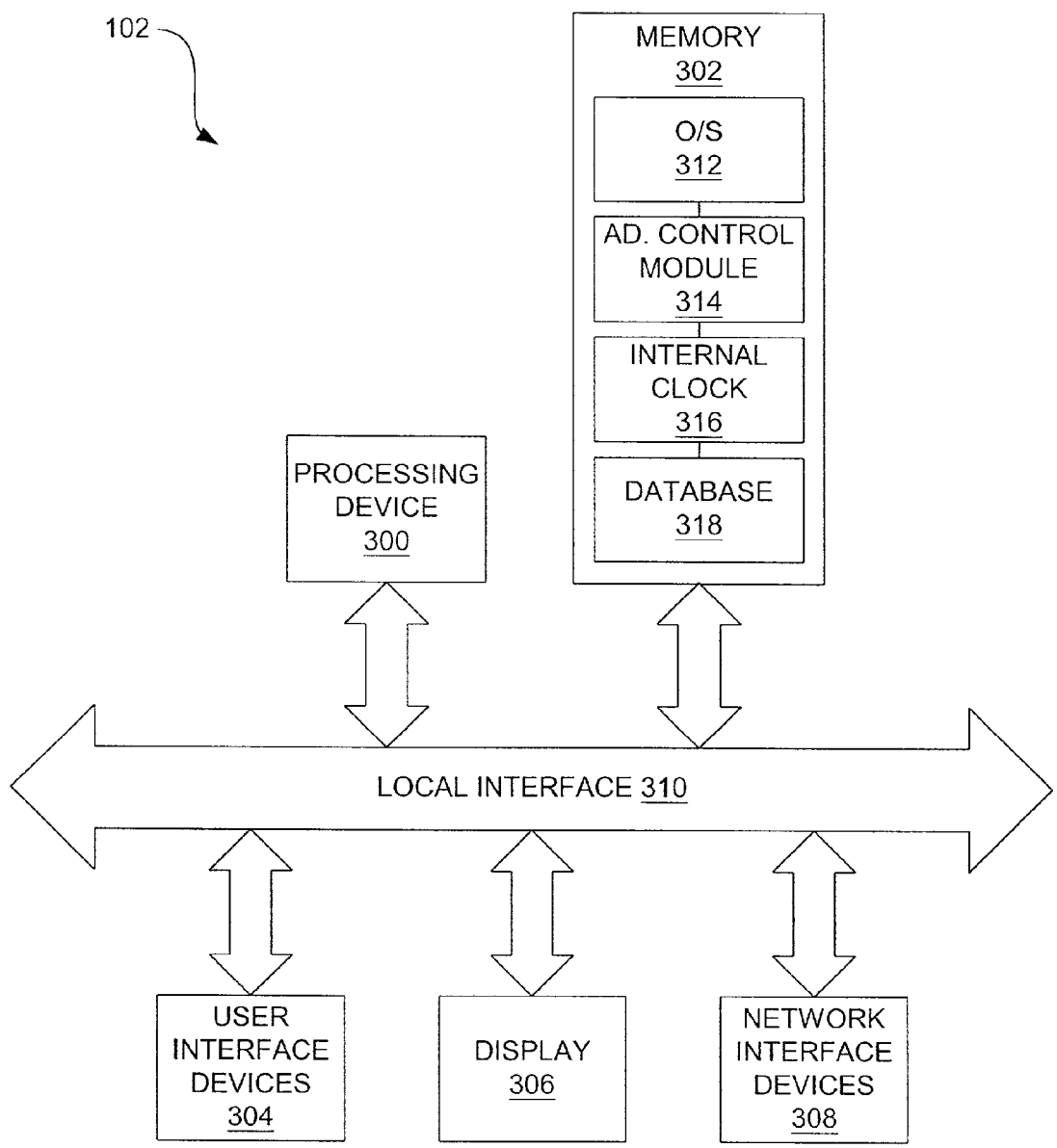
FIG. 3 is a schematic view of a local computing device shown in FIG. 1.

FIG. 3 is a schematic view illustrating an example architecture for the local computing devices 102. As indicated in FIG. 3, each local computing device 102 can comprise a processing device 300, memory 302, one or more user interface devices 304, a display 306, one or more network interface devices 308, and a local interface 310 to which each of the other components electrically connects. The local interface 310 may have additional elements, which are omitted for simplicity, such as controllers, buffers (caches), drivers, repeaters, and receivers to enable communications. Furthermore, the local interface 310 may include address, control, and/or data connections to enable appropriate communications among the aforementioned components.

The processing device 300 can include any custom made or commercially available processor, a central processing unit (CPU) or an auxiliary processor among several processors associated with the local computing device 102, a semiconductor based microprocessor (in the form of a microchip), or a macroprocessor. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The user interface devices 304 typically comprise those normally used in conjunction with a PC. For instance, the user interface devices 304 can comprise a keyboard and mouse. Similarly, the display 306 can comprise a display device normally used with a PC, such as a computer monitor. The one or more network interface devices 308 comprise the hardware with which the local computing device 102 transmits and receives information over the network 108. By way of example, the network interface devices 308 include components that communicate both inputs and outputs, for instance, a modulator/demodulator (e.g., modem), a radio frequency (RF) or other transceiver, a telephonic interface, a bridge, a router, etc.

The memory 302 comprises various software programs including an operating system 312, an advertisement control module 314, and an internal clock 316. The operating system 310 controls the execution of other software, such as the advertisement control module 314, and provides scheduling, input-output control, file and data management, memory management, and communication control and related services. The advertisement control module 314 is configured to control the operation of the display unit(s) 104 in communication with the local computing device 102 relative to current or upcoming weather conditions and relative to the current time. An example of the operation of the advertisement control module 314 is provided below with reference to FIGS. 5-6. The internal clock 316 is configured to maintain current local time. The memory 302 can also comprise a database 318 that is configured to store various information used by the advertising control module 314. By way of example, the database 318 can store advertising material that is to be presented to customers in the display unit(s) 104 as well as information that correlates weather and/or time conditions with the advertisements to be presented to customers.

Figure 4:
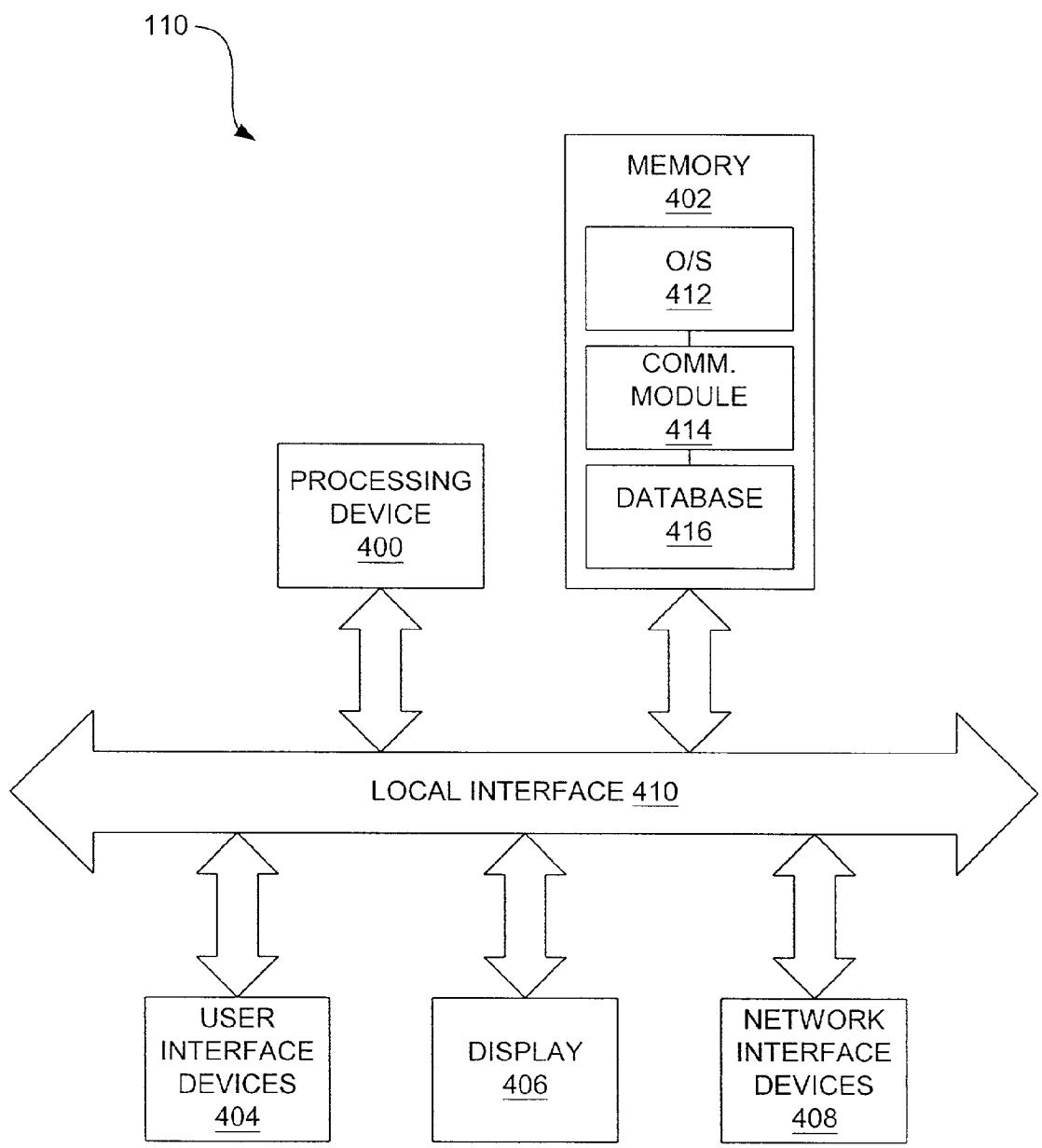
FIG. 4 is a schematic view of a remote computing device shown in FIG. 1.

FIG. 4 is a schematic view illustrating an example architecture for the remote computing device 110. As indicated in FIG. 4, the remote computing device 110 can be similar in configuration to the local computing devices 102. Accordingly, the remote computing device 110 can comprise a processing device 400, memory 402, one or more user interface devices 404, a display 406, one or more network interface devices 408, and a local interface 410 to which each of the other components electrically connects. Each of these components can have construction similar to those described above in relation to the local computing devices 102. Accordingly, a detailed discussion of these components is not provided herein.

Like memory 302, the memory 402 comprises various software programs. These programs can include an operating system 412 and a communication module 414. The operating system 410 controls the execution of other software and provides scheduling, input-output control, file and data management, memory management, and communication control and related services. The communication module 414 is configured to, in conjunction with the network interface devices 408, facilitate communications via the network 108. As is discussed below, the communication module 414 can, more particularly, be used to transmit weather forecast information to the advertisement control modules 314 of the local computing devices 102. In addition, the memory 402 can comprise a database 416 that is configured to store advertising material that is to be downloaded to the databases 318 of the local computing devices 102.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example advertisement presentation control system 100 having been described above, operation of the system will now be discussed. In the discussion that follows, a flow diagram is provided. It is to be understood that any functional descriptions contained within blocks or other elements of the flow diagram represent modules, segments, or portions of code that include one or more executable instructions for implementing specific logical functions or steps. As will be appreciated by persons having ordinary skill in the art, the individual functions or steps described in the flow diagram may be executed out of order from that shown or discussed, including substantially concurrently or in reverse order, depending on the functionality involved.

Figure 5:
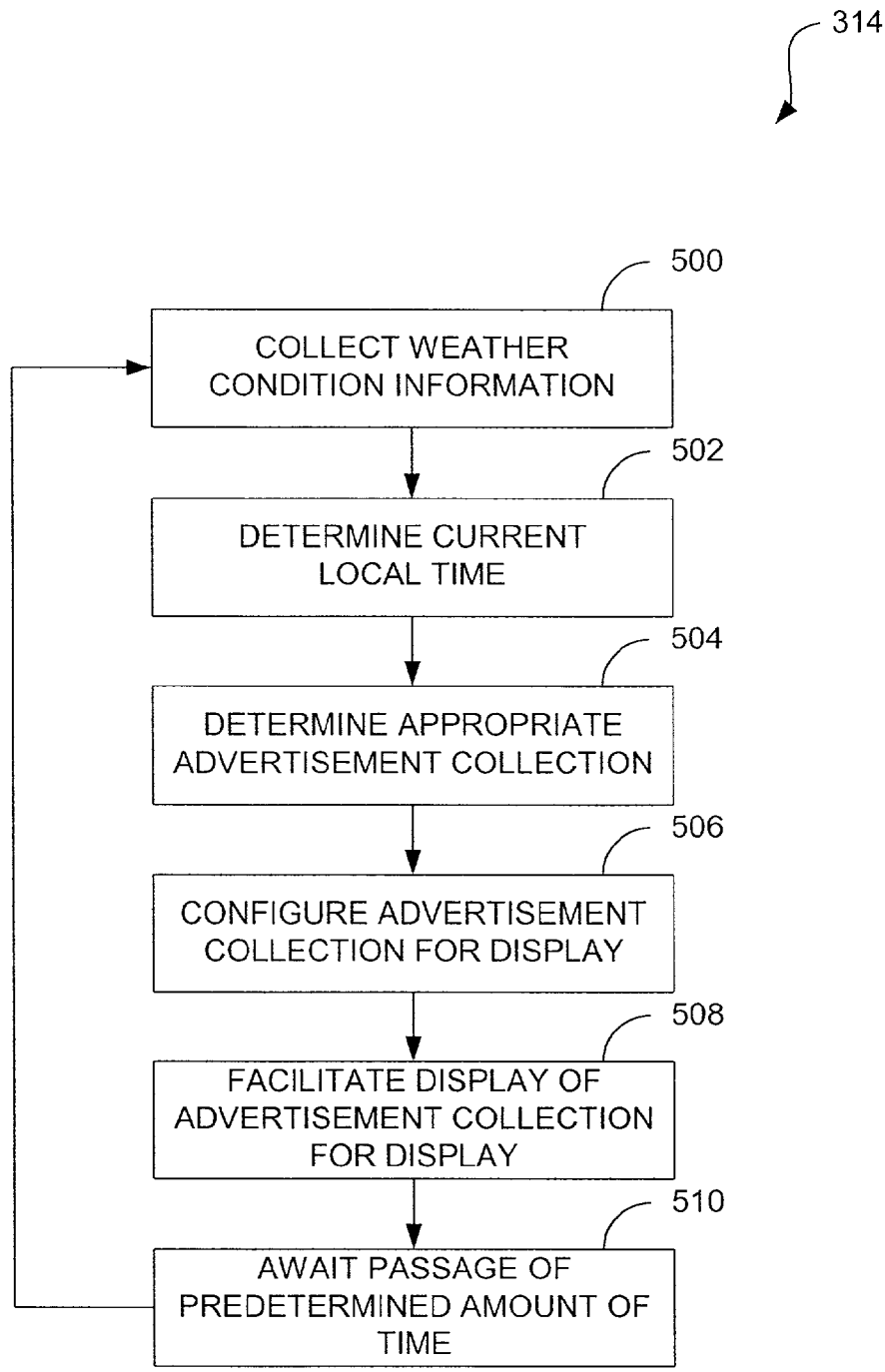
FIG. 5 is a flow diagram that illustrates an example of the operation of an advertising control module shown in FIG. 3.

Referring now to FIG. 5, illustrated is an example of operation of the advertisement control module 314. It is to be understood that this example is provided for purposes of illustration only and that persons having ordinary skill in the art will appreciate that the advertisement control module 314 can operate in alternative manners to achieve the same or similar results. Beginning with block 500, the advertisement control module 314 collects weather condition information. This weather condition information can pertain to current local weather conditions sensed by the sensing unit 106, weather forecast information obtained from the remote computing device 110 (or other source), or both.

Collection of current local weather conditions is useful to ensure that advertisements that are inappropriate for current weather conditions are not presented to the user. For example, if it is currently raining, it may be less desirable to advertise sunglasses or sunscreen to the customer as opposed to umbrellas. Similarly, collection of weather forecast information can be useful such that goods and services that the user may soon need can be advertised. To cite an example, if a large amount of snowfall is anticipated, snow shovels can be advertised to the customer. As will be appreciated by persons having ordinary skill in the art, such forecast information can either be passively received from the remote computing device 10, which can be preprogrammed to periodically transmit this information to all computing devices 102, or can be actively retrieved by the advertisement control module 314 from the remote computing device (or other source) on a periodic basis selected locally by the system administrator.

As indicated in block 502, the current local time can also be determined by the advertisement control module 314, for example, by referring to the internal clock 316. This information is useful to the advertisement control module 314 because, as noted above, the goods or services offered to the customer may be more or less appealing to the customer depending upon the time of day the advertisement is presented. Once the weather condition and time information has been collected, the advertisement control module 314 can determine which advertisements are appropriate based upon these conditions. Accordingly, as indicated in block 504, the advertisement control module 314 can determine an appropriate advertisement collection for display in the display unit(s) 104.

By way of example, the advertisement selections can be made with reference to a correlation table such as that schematically illustrated in FIG. 6. As indicated in this figure, the correlation table 600 (or equivalent correlation device) can cross applicable weather conditions 602 with stored advertisements 604 that are to be displayed when these weather conditions are sensed or anticipated. Where current local time is also a factor considered by the advertisement control module 314 in making the determination as to which advertisements to display, a similar correlation table (not shown) that crosses the time of day with applicable advertisements can be used. Alternatively or in addition, the data associated with each advertisement can include metadata tags that identify which advertisements are or are not appropriate for certain conditions. Priority may further be assigned to particular advertisements under each condition for determining the sequence, duration, or both relative to other advertisements. In an example arrangement, advertisement selections can be made by disqualifying available advertisements based upon the weather conditions and/or time until only a collection of appropriate advertisements remains. Although the collection of advertisements is described herein as being selected with reference only to weather conditions and current local time, it is to be understood that many other factors could be used to dictate which advertisements are selected. Indeed, several advertisements may apply irrespective of the particular weather conditions or time of day. For example, fuel stations may wish to advertise a particular type of gasoline regardless as to the outdoor temperature or time. Therefore, such an advertisement is potentially always appropriate for presentation.

Returning to FIG. 5, once the collection of appropriate advertisements has been determined, the advertisement control module 314 can configure the advertisement collection for display, as indicated in block 506. Such configuration may comprise determining the sequence in which the advertisements will be presented, the duration for which each will be displayed, etc. At this point, the advertisement control module 314 can facilitate the display of the advertisement collection by the display unit(s) 104, as indicated in block 508. This facilitation can either comprise real time transmission of the individual advertisements to the display unit(s) 104 for viewing such that a single advertisement is transmitted each time a different advertisement is to be presented, or transmission of all the advertisements of the collection to be displayed sequentially by the display unit. In the latter case, the transmission typically comprises the advertisement data as well as instructions as to their display. In such a scenario, the display unit(s) 104 may include local memory for temporary storage of the advertisements.

Once the advertisements have been transmitted, they can be presented to customers with the display unit(s) 104. At this point, the advertisement control module 314 can await the passage of a predetermined amount of time, as indicated in block 510, before again collecting weather condition and current local time information in the manner described above. Operating in this manner, the advertisement control module 314 can control the display unit(s) 104 such that only advertisements that are appropriate to current and upcoming weather conditions and current local time are presented to customers. In addition, such control is provided without the need for the system administrator to diligently change the advertisements presented to customers as conditions (e.g., weather, time) change.

While particular embodiments of the invention have been disclosed in detail in the foregoing description and drawings for purposes of example, it will be understood by those skilled in the art that variations and modifications thereof can be made without departing from the scope of the invention as set forth in the following claims. For instance, although the invention has been described as being used with fuel pump displays, it is to be appreciated that the invention could be used with other such displays such as large roadside displays, displays on buildings, etc. Moreover, although the invention has been described in the fuel station environment, it is to be appreciated that the concepts disclosed herein may apply to substantially any environment in which advertisements to be presented may be inappropriate due to certain applicable conditions.

What is claimed is:

1. A method for controlling the presentation of advertisements, the method being practiced by a local computing device having a processing device and a memory, the method comprising:
receiving local weather condition information from a sensing unit that is separate from the computing device;
determining which advertisements are appropriate for presentation using the local computing device and based upon the received weather condition information; and
facilitating presentation of appropriate advertisements on a local display unit.

2. The method of claim 1, wherein facilitating presentation of appropriate advertisements comprises transmitting the appropriate advertisements from the computing device to the local display unit.

3. The method of claim 2, wherein the display unit is mounted to a fuel pump.

4. The method of claim 1, further comprising determining the current local time using the local computing device and determining which advertisements are appropriate for presentation based upon the current local time using the local computing device.

5. The method of claim 1, wherein different advertisements are selected for presentation as the weather condition information changes.

6. The method of claim 1, wherein the local weather condition information comprises at least one of temperature, barometric pressure, precipitation, brightness, humidity, and wind force.

7. The method of claim 1, wherein the local weather condition information comprises at least one of barometric pressure, precipitation, brightness, humidity, and wind force.

8. The method of claim 1, wherein determining which advertisements are appropriate for presentation comprises disqualifying available advertisements with reference to a correlation table.

9. Advertisement presentation control software stored on a computer readable medium of a local computing device, comprising:
logic configured to collect local weather condition information from a sensing unit that is separate from the local computing device;
logic configured to determine which advertisements are appropriate for presentation based upon the collected weather condition information; and
logic configured to transmit appropriate advertisements to a display unit that is separate from the local computing device.

10. The software of claim 9, further comprising logic configured to determine the current local time and logic configured to determine which advertisements are appropriate for presentation based upon the current local time.

11. The system of claim 9, wherein the local weather condition information comprises at least one of temperature, barometric pressure, precipitation, brightness, humidity, and wind force.

12. The system of claim 9, wherein the local weather condition information comprises at least one of barometric pressure, precipitation, brightness, humidity, and wind force.

13. The system of claim 9, wherein the logic configured to determine which advertisements are appropriate comprises logic configured to disqualify available advertisements with reference to a correlation table.

14. A method for controlling the presentation of advertisements practiced by a local computing device having a processing device and a memory, the method comprising:
receiving local weather forecast information with the local computing device that is collected by and transmitted from a remote server via a network;
determining which advertisements are appropriate for presentation on a local display unit using the computing device and based upon the received local weather forecast information; and
transmitting appropriate advertisements from the local computing device to the local display unit, the local display unit being separate from the local computing device.

15. The method of claim 14, wherein the local display unit is mounted to a fuel pump.

16. The method of claim 14, further comprising determining the current local time using the local computing device and determining which advertisements are appropriate for presentation based upon the current local time using the local computing device.

17. Advertisement presentation control software stored on a computer readable medium of a local computing device, comprising:
logic configured to receive local weather forecast information that is collected by and transmitted from a remote server via a network;
logic configured to determine which advertisements are appropriate for presentation on a local display unit using the computing device and based upon the received local weather forecast information; and
logic configured to transmit appropriate advertisements from the local computing device to the local display unit, the local display unit being separate from the local computing device.

18. The software of claim 17, further comprising logic configured to determine the current local time and logic configured to determine which advertisements are appropriate for presentation based upon the current local time using the local computing device.

* * * * *